March 31, 1959  J. A. HERRMANN ET AL  2,880,263
NARROW PANELBOARD HAVING SUSPENDED MAIN LUGS
Filed Dec. 28, 1956  4 Sheets-Sheet 1
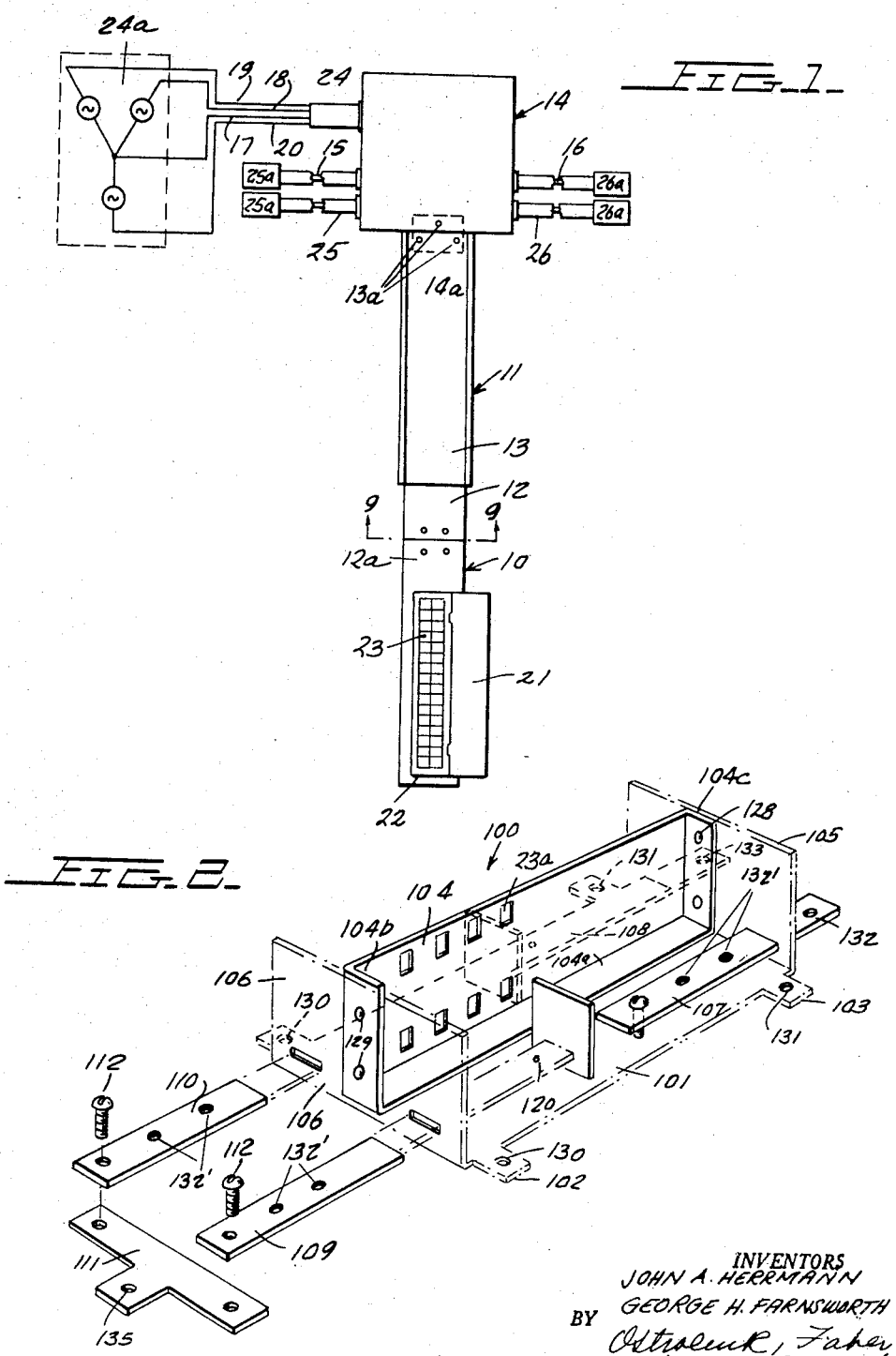
INVENTORS
JOHN A. HERRMANN
GEORGE H. FARNSWORTH
BY
ATTORNEYS

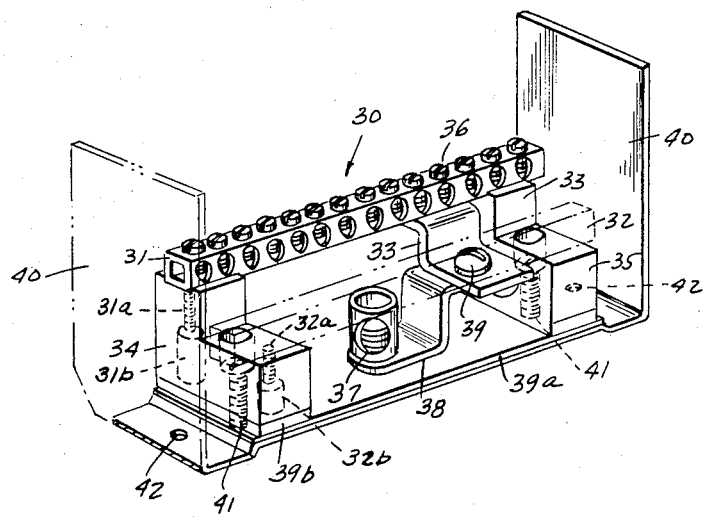

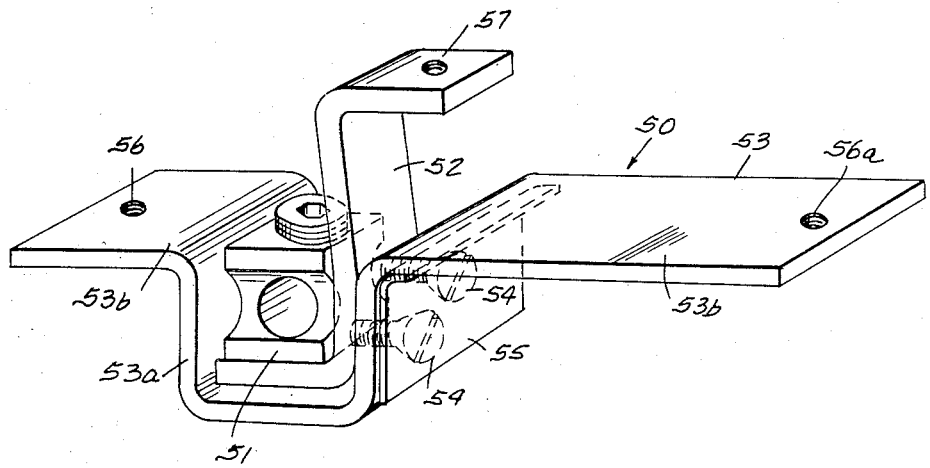
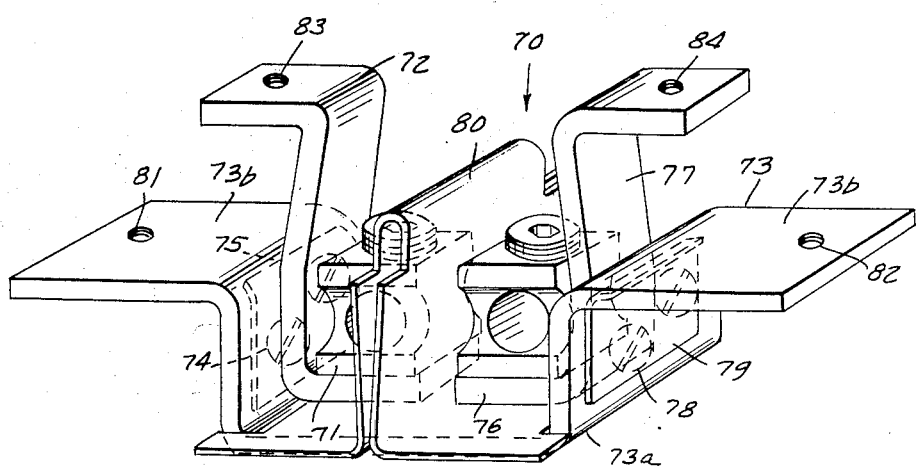

March 31, 1959 J. A. HERRMANN ET AL 2,880,263
NARROW PANELBOARD HAVING SUSPENDED MAIN LUGS
Filed Dec. 28, 1956 4 Sheets-Sheet 4
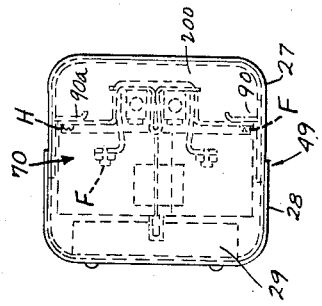
INVENTORS
JOHN A. HERRMANN
GEORGE H. FARNSWORTH
BY Ostrolenk, Faber,
Gerb & Soffen
ATTORNEYS

United States Patent Office 2,880,263
Patented Mar. 31, 1959

2,880,263

NARROW PANELBOARD HAVING SUSPENDED MAIN LUGS

John A. Herrmann, Grosse Pointe Farms, and George H. Farnsworth, Detroit, Mich., assignors, by mesne assignments, to I-T-E Circuit Breaker Company, Philadelphia, Pa., a corporation of Pennsylvania Application December 28, 1956, Serial No. 631,153

12 Claims. (Cl. 174—60)

This application relates to panelboards and more particularly to narrow column type panelboards.

Previous panelboards of the narrow column type, of necessity, have enclosures of small outside dimensions and as a result the internal wiring space or gutter is quite small. In addition the main lugs were permanently mounted to the back of the enclosure projecting into the wiring gutter. Because the main lugs were so mounted, they had to be positioned within bulky barriers. These bulky barriers and main lugs aggravated the already cramped conditions in the wiring gutter, making wiring of the panelboard all the more difficult.

Our invention has improved the wiring conditions in the gutter of the panelboard without increasing the size of the enclosure by providing suitable means for suspending the main wiring terminals from the sides of the enclosure rather than mounting the terminals to the back. Suspension of the main terminals permits wiring in the gutter directly below these main terminals as well as additional wiring space on each side. The main wire terminals are also accessible from either direction, top or bottom of the enclosure, and the convenience of adding a double barrel lug for feed through wiring will not detract from the space in the wiring gutter.

This invention also provides a reversible interior and a telescopic wiring trough that may be inserted in either end of the panelboard enclosure to permit the branch circuit wires to run out the top or bottom of the panel enclosure regardless of the direction from which the main cables were introduced. The trough is made adjustable for ease of installation and so that the length of the trough may be adjusted to extend from the panelboard enclosure to either the floor or pull box. Provisions are also provided to maintain the grounding continuity of the system.

Accordingly, a primary object of our invention is to provide a narrow colum type panelboard in which the wiring conditions of the panel have been improved without increasing the size of the panelboard enclosure.

Another object is to provide a means for suspending the main wire lugs from the sides of the panelboard enclosure.

Still another object is to provide main wire lugs that can be fed from the top or bottom of the assembly.

Still another object is to provide a panelboard assembly in which the main lugs are of the double barrel or feed through type.

A further object is to provide a panelboard assembly in which the interior is reversible.

A still further object is to provide a wiring extension that may be attached to the panelboard enclosure.

Another object is to provide a telescoping wiring trough extension.

These and other objects of our invention will become apparent after reading the following description and drawings in which:

Figure 1 is a diagrammatic representation of a complete electrical system from the generators to the load through the panelboard assembly and wiring trough that constitutes our invention.

Figure 2 is a perspective view of the panel assembly.

Figure 3 is a perspective view of the neutral terminal assembly.

Figure 4 is a perspective view of the first main terminal assembly.

Figure 5 is a perspective view of the second main terminal assembly.

Figure 6 is a perspective view of a section of the mounting rib with a circuit breaker and a filler plate shown mounted thereto.

Figure 7 is a plan view of the panelboard assembly with the front channel removed.

Figure 7A is a side view of the panelboard assembly taken along section 7A—7A of Figure 7 looking in the direction of arrows 7A—7A.

Figure 8 is an end view of the panelboard assembly looking in from the bottom with the end plate removed.

Figure 9 is an end view of the telescoping trough taken along line 9—9 of Figure 1 looking in the direction of arrows 9—9.

Referring to Figure 1, a panelboard assembly 10 is shown with its bottom end resting on the floor. The assembly 10 is connected to a pull box 14 by means of wiring trough 11, with the inside section of the trough 12 being affixed to the panelboard assembly 10 by means of fasteners 12a and the outside section of the trough 13 being affixed to the pull box 14 by means of fasteners 13a. Main cables 17—20 from power source 24a are shown entering the pull box 14 through conduit 24 and branch circuit wires 15 are shown leaving the left side of pull box 14 through conduits 25 which run to loads 25a, and branch circuit wires 16 are shown leaving the right side of pull box 14 through conduits 26 which run to loads 26a. The main cables 17—20 and branch wires 15, 16 pass from the pull box 14 through the wiring trough 11 to the panelboard assembly 10. The door 21 of panelboard assembly 10 which is provided to cover aperture 22 is shown in its open position to expose circuit breakers 23 which are circuit breakers of the type disclosed in Patent Number 2,374,778 entitled Switch, by E. T. Platz, issued May 1, 1945, assigned to the assignee of the instant invention.

The panelboard assembly 10, to be hereinafter described, is adapted for a three phase four wire system which is to feed single phase branch loads.

Referring to Figures 7 and 7A, the panelboard assembly 10 includes a front channel 28 and a back channel 27 which are joined to form an enclosure 49, a panel assembly 100 (Fig. 2) a neutral terminal assembly 30 (Fig. 3) a first terminal assembly 50 (Fig. 4) and a second terminal assembly 70 (Fig. 5).

The panel assembly 100 illustrated in Fig. 2 consists of a rectangular plate 101 welded or otherwise secured to mounting straps 102 and 103. A mounting rib 104 having openings 23a for mounting the circuit breakers 23 is welded or otherwise secured to plate 101 on leg 104a. To extension 104b at one end of mounting rib 104 is affixed insulating plate 106 by means of rivets 129. Insulating plate 105 is affixed to the other end of plate 101 at extension 104c by means of rivets 128.

One end of bus bar 109 is spaced and insulated from plate 101 by means of threaded insulating sleeve 113 and secured thereto by screws 114 and 115 as they are received by the internal threads of sleeve 113. In a similar manner one end of bus bar 110 is spaced, insulated, and secured to plate 101 by means of sleeve 116 and screws 117 and 118. The other ends of bus bars 109 and 110 pass through rectangular openings in insulator 106 and are fastened to conducting strap 111 by means of screws 112.

Sleeve 121 and screws 122 and 123 insulate space and secure one end of bus bar 107 from plate 101 as do sleeve 124 and screws 125 and 125a in the case of bus bar 108. The other ends of bus bars 107 and 108 pass through appropriate openings in insulator 105.

Insulator 119 is affixed to the free end of bus bar 109 by means of screw 120 and serves as a barrier between bus bars 107 and 109. Insulator 126 secured to bus bar 108 by screw 127, serves as a barrier between bus bars 108 and 110.

Holes 132 and 133 are used in securing bus bars 107 and 108 to terminal assembly 70 and hole 135 is used to secure strap 111 to terminal assembly 50. Holes 132' in bus bars 107—110 are used for connecting the line terminals 206 of the circuit breakers 23.

Clearance holes 130 at either end of mountinng strap 102 and clearance holes 131 at either end of mounting strap 103 are used in securing the panel assembly 100 to the back channel 27 of enclosure 49.

Referring to Figure 4, the first terminal assembly 50 consists of an insulated suspending member 53 and a main lug 51. The suspending member 53 has a main U-shaped section 53a and mounting extensions 53b extending outwardly from the tops of each of the arms of the U-shaped section 53a. The main lug 51 is mounted on the web of the U-shaped section 53a and is secured to the suspending member 53 by means of flat head screws 54 which engage tapped holes in lug extension 52 of the main lug 51. A strip of insulating tape 55 covers the heads of screws 54. Clearance holes 56 and 56a, located at each end of mounting extensions 53b, are used in securing the terminal assembly 50 to the back channel 27. A tapped hole 57 is located in the upper horizontal portions of extension 52 and is used in making the electrical connection between the main lug 51 and the conducting strap 111.

The second terminal assembly 70, illustrated in Fig. 5 is similar to the first terminal assembly 50. Assembly 70 consists of two main lugs 71 and 76 having lug extensions 72 and 77 respectively. The lugs 71 and 76 are both mounted on the web of U-shaped section 73a of the insulated suspending member 73 by means of flat head screws 74 and 78 whose heads are covered by insulating tape 75 and 79. Tapped holes 83 and 84 are located in the upper horizontal portions of extensions 72 and 77 to aid in making the electrical connection to bus bars 107 and 108. Clearance holes 81 and 82 cut from mounting extensions 73b that extend outwardly from the tops of the arms of U-shaped section 73a of suspending member 73 to aid in mounting the terminal assembly 70 to the back channel 27. An insulating barrier 80 is used to prevent electrical breakdown in the gap between main lugs 71 and 76. Barrier 80 is also interspaced between the lugs 71 and 76 and suspending member 73 and is thereby prevented from having vertical movement. Horizontal movement of the barrier 73 is prevented by C-shaped cut outs in the barrier that cooperate with the arms of the U-shaped portion 73a of the suspending member 73.

Figure 3 illustrates neutral terminal assembly 30 which consists of two L-shaped insulating standoffs 34 and 35. Identical neutral bus bars 31 and 32, having a plurality of branch circuit terminals 36, are affixed to the top of the vertical and horizontal sections, respectively, of standoffs 34 and 35 at each end of the bus bars 31 and 32 by means of screws 31a and 32a which pass through clearance holes 316 and 326 of the standoffs 34 and 35. At a point intermediate their ends, bus bars 31 and 32 are electrically secured to offset strap 33. The neutral lug 37 is in turn secured to offset strap 33 by means of lug extension 38 and screw 39.

Standoffs 34 and 35 are secured to frame 40 by means of screws 41. Insulating sheet 39a and blocks 39b are interposed between standoffs 34, 35 and the frame 40.

Holes 42 are cut in frame 40 to aid in securing neutral terminal assembly 30 to the back channel 27.

Referring to Figures 6, 7, 7A and 8, the enclosure 49 of the panelboard assembly 10 is formed of two long U-shaped members 27 and 28 that are called the back channel and front channel respectively. Affixed to the bottom end of the back channel 27 by means of screws 47 is end plate 48. The front channel 28 is affixed to the end plate by screws 46. The end plate 48 may be mounted to either end of the enclosure 49 depending upon which direction the panelboard assembly 10 is being fed from. In cases where cables enter or leave the assembly 10 from both the top and bottom, the end plate 48 is omitted and the trough 11 or extension plate 14a are relied upon to position the front and back channels 28 and 27 with respect to each other.

Projecting inwardly from the sides of back channel 27 and running longitudinally therewith are side rails 90 and 90a. The first and second terminal assemblies 50 and 70 are secured in the enclosure 49 by means of main lug support screws H that are received by tapped holes in the side rails 90 and 90a.

Thus, the main lugs 51, 71, 76 are suspended above the back surface of the channel 27 permitting the wiring gutter 200 to extend below the main lugs 51, 71, 76. With this suspended arrangement the main lugs 51, 71, 76 are readily accessible from either the top or bottom of the panelboard assembly 10 and a double barreled lug may be used.

The panel assembly 100 is then secured to the side rails 90 and 90a by means of mounting plate screws E which pass through openings 130 and 131. At this time the bus bars 107, 108 and strap 111 overlie the extensions of main lugs 51, 71, 76. Bus bar 108 is electrically connected to main lug 71 by passing the body of main bus bar screw F through clearance hole 133 into the tapped hole 83. In a similar manner the other main bus bar screws F serve to electrically secure bus bar 107 and strap 111 to main lugs 76 and 51.

Neutral terminal assembly 30 is mounted to the back of the enclosure 49 by means of screws 45.

Wiring of the panelboard assembly 10 proceeds as follows. When the main cables 17—20 feed the panelboard assembly 10 from the top, neutral terminal assembly 30 remains on the right hand side as illustrated. Remove the panel assembly 100 by removing bus bar screws F and mounting plate screws E. Pull main cables 17—20 and branch wires 15, 16 into back channel 27 and place in wiring gutter 200. Connect main cables 18—20 to main lugs 51, 71, 76 and neutral cable 17 to neutral lug 37. Place branch wires behind side rails 90, 90a and pull through holes 91, 91a in the side rails 90, 90a and bend wire over outer channel edge. Holes 91, 91a are appropriately numbered and positioned to correspond to a particularly located circuit breaker 23. Allow approximately four inches of slack and skin ¼" for connection to load terminals 201 of circuit breaker 23. Set panel assembly 100 with the required number of circuit breakers 23 and filler plates 203. The circuit breakers 23 are mounted on the mounting rib 104 by mating the breaker ears 23b to the holes 23a in the mounting rib 104. In a similar manner filler plates 203 are mounted to rib 104 by means of ears 204. Set panel assembly 100 with circuit breakers 23 and filler plates 203 mounted thereon on the side rails 90, 90a. Tighten screws E at corners of panel assembly 100 for mechanical strength and tighten screws F for electrical connections of the bus bars 107—110 to main lugs 51, 71, 76. Pass bodies of screws 205 through line terminals 206 of circuit breakers 23 into holes 132' tapped in bus bars 107—110 to provide an electrical connection between the bus bars 107—110 and the circuit breakers 23. Connect the branch wires 15, 16 to the line terminals 201 of the appropriate circuit breakers 23.

Place the front channel 28 over the back channel 27 and secure by means of screws 12a and 46. Aperture 22 in the front channel 28 is surrounded by a trim flange 29 that extends inwardly to form an enclosure exposing only the handles 207 or such part of the interior that was intended to be exposed. Secure the neutral branch wires to the neutral-terminals 36.

Should it become necessary to feed the panelboard assembly 10 from the bottom the interior may be reversed as follows. Remove screws 42 of the neutral terminal assembly 30. Reverse neutral assembly 30 by 180° and mount to tapped holes 92 in the left side of the back channel 27. Remove main lug support screws H and the panel assembly screws E. Remove the panel assembly 100 and the terminal assemblies 50, 70 attached thereto and rotate 180°. Place back on side rails 90, 90a and refasten only the main lug support screws H. Remove the panel assembly 100 by removing bus bars screws F. Continue installation as for top feed.

The adjustable extension or wiring trough 11 (Figs. 1 and 9) consists of a telescoping inner sleeve 303 and an outer sleeve 306. The inner sleeve 303 is formed of two channels 301 and 302 longitudinally joined to one another by welding or other suitable means. Tapped holes 307 in sleeve 303 receive screws 12a to secure the inner sleeve 303 to the panelboard assembly 100 taking the place of the end plate 48.

The outer sleeve 306 consists of two channel sections 304 and 305 and is affixed to the pull box 14 by means of screws 13a and extension 14a. Channel sections 304 and 305 are joined by screws 309 that are received by tapped holes in channel 305. Screw 308 having a sharp tip serves as an electrical ground connection between the two channels 304 and 305.

While the preferred embodiment of our invention has been described as being for a three phase four wire system that is feeding a plurality of single phase loads, our novel arrangement may be adapted for use with an electrical system having any number of phases or wires. Since many variations and modifications of our invention will now be obvious to those skilled in the art, we prefer to be bound not by the specific disclosure herein contained, but only by the appended claims.

We claim:

1. A panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being supported by and suspended from said side rails to thereby be spaced from the bottom of said back channel, to provide a wiring gutter therebetween.

2. A panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being supported by and suspended from said side rails to thereby be spaced from the bottom of said back channel; said panel assembly being positioned between said first and second terminal assemblies.

3. A narrow column type panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being supported by and suspended from said side rails to thereby be spaced from the bottom of said back channel; said panel assembly being positioned between said first and second terminal assemblies; current connections joining said first and second terminal assemblies to said panel assembly; said first and second terminal assemblies being insulated from each other; said first and second terminal assemblies each being comprised of a suspending member having secured thereto at least one main lug.

4. A panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being positioned to straddle said side rails and supported by and suspended from said side rails to thereby be spaced from the bottom of said back channel; said panel assembly being positioned between said first and second terminal assemblies; current connections joining said first and second terminal assemblies to said panel assembly; said first and second terminal assemblies being insulated from each other; said first and second terminal assemblies each being comprised of a suspending member having secured thereto at least one main lug.

5. A panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being positioned to straddle said side rails and supported by and suspended from said side rails to thereby be spaced from the bottom of said back channel; said panel assembly being positioned between said first and second terminal assemblies; current connections joining said first and second terminal assemblies to said panel assembly; said first and second terminal assemblies being insulated from each other; said first and second terminal assemblies each being comprised of a suspending member having secured thereto at least one main lug; said suspending members each being comprised of a main U-shaped section and two mounting extensions; each of said mounting extensions being secured to and extending outwardly from the tops of the legs of said main U-shaped section; said mounting extensions being made of an electrically insulating material.

6. A panelboard assembly being comprised of a back channel, a front channel, a neutral terminal assembly, a panel assembly, a first terminal assembly and a second terminal assembly; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said back channel being comprised of an elongated U-shaped member having side rails secured to each of the legs thereof; said neutral terminal assembly being secured to the web of said back channel; said panel assembly, said first terminal assembly and said second terminal assembly being positioned to straddle said side rails and supported by and suspended from said side rails to thereby be spaced from the bottom of said back channel; said panel assembly being positioned between said first and second terminal assemblies; current connections joining said first and second terminal assemblies to said panel assembly; said first and second terminal assemblies being insulated from each other; said first terminal assembly being comprised of a suspending member and a main lug; said second terminal assembly being comprised of a suspending member and two main lugs; said suspending members each being comprised of a main U-shaped section and two mounting extensions; each of said mounting extensions being secured to and extending outwardly from the tops of the legs of said main U-shaped section; said mounting extensions being made of an electrically insulating material; said main lugs being mounted on the web of the U-shaped sections of their said associated suspending members; said front channel being comprised of an elongated U-shaped member; said front and back channels being joined along their legs to form a tube shaped enclosure for said panel assembly and said first, second and neutral terminal assemblies.

7. A panelboard assembly being comprised of a back channel, a panel assembly, a first terminal assembly and a second terminal assembly; said back channel being comprised of an elongated U-shaped member having side rails secured to each of the legs thereof; said panel assembly, said first terminal assembly and said second terminal assembly being positioned to straddle said side rails and supported by and suspended from said side rails to thereby be spaced from the bottom of said back channel; said panel assembly being positioned between said first and second terminal assemblies; current connections joining said first and second terminal assemblies to said panel assembly; said first and second terminal assemblies being insulated from each other; said first and second terminal assemblies each being comprised of a suspending member having secured thereto at least one main lug; said suspending members each being comprised of a main U-shaped section and two mounting extensions; each of said mounting extensions being secured to and extending outwardly from the tops of the legs of said main U-shaped section; said mounting extensions being made of an electrically insulating material; said panel assembly being comprised of a plate, a mounting rib centrally positioned on said plate and a plurality of bus bars secured to said plate and insulated from said mounting rib and said plate.

8. A panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being supported by and suspended from said side rails to thereby be spaced from the bottom of said back channel; said panel assembly and said first and second terminal assemblies being selectively supported and suspended on said rails for electrical connection from either end.

9. A panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being positioned to straddle said side rails and supported by and suspended from said side rails to thereby be spaced from the bottom of said back channel; said panel assembly being positioned between said first and second terminal assemblies; current connections joining said first and second terminal assemblies to said panel assembly; said first and second terminal assemblies being insulated from each other; said first and second terminal assemblies each being comprised of a suspending member having secured thereto at least one main lug; said panel assembly and said first and second terminal assemblies being selectively supported and suspended on said rails for electrical connection from either end.

10. A panelboard assembly being comprised of a back channel, a panel assembly, a first terminal assembly and a second terminal assembly; said back channel being comprised of an elongated U-shaped member having side rails secured to each of the legs thereof; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being positioned to straddle said side rails to thereby be spaced from the bottom of said back channel; said panel assembly being positioned between said first and second terminal assemblies; current connections joining said first and second terminal assemblies to said panel assembly; said first and second terminal assemblies being insulated from each other; said first and second terminal assemblies each being comprised of a suspending member having secured thereto at least one main lug; said suspending members each being comprised of a main U-shaped section and two mounting extensions; each of said mounting extensions being secured to and extending outwardly from the tops of the legs of said main U-shaped section; said mounting extensions being made of an electrically insulating material; said panel assembly and said first and second terminal assemblies being selectively supported and suspended on said rails for electrical connection from either end.

11. A panelboard assembly and a wiring extension; said panelboard assembly being comprised of a back channel, a panel assembly, a first terminal assembly and a second terminal assembly; said back channel being comprised of an elongated U-shaped member having side rails secured to each of the legs thereof; a front channel; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first treminal assembly and said second terminal assembly being supported by and suspended from said side rails to thereby be spaced from the bottom of said back channel; said front channel being comprised of an elongated U-shaped member; said front and back channels being joined along their legs to form a tube shaped enclosure for said panel assembly and said first, second and neutral terminal assemblies; said wiring extension being comprised of an outer sleeve and an inner sleeve partially positioned within said outer sleeve in a telescoping arrangement; said wiring extension having a cross section substantially equal to the cross section of said enclosure; said inner or outer sleeve being secured to one end of said enclosure with the axes of said enclosure and said wiring extension being in line so as to form a continuous enclosure.

12. A panelboard assembly and a wiring extension; said panelboard assembly being comprised of a back channel, a panel assembly, a first terminal assembly and a second terminal assembly; said back channel being comprised of an elongated U-shaped member having side rails secured to each of the legs thereof; a front channel; said panel assembly being comprised of a rectangular plate, end plates, a mounting rib and a plurality of bus bars; said mounting rib being centrally positioned on said rectangular plate; said plurality of bus bars being secured to said rectangular plate and insulated from both said rectangular plate and said mounting rib; said panel assembly, said first terminal assembly and said second terminal assembly being supported by and suspended from said side rails to thereby be spaced from the bottom of said back channel; said front channel being comprised of an elongated U-shaped member; said front and back channels being joined along their legs to form a tube shaped enclosure for said panel assembly and said first, second and neutral terminal assemblies; said wiring extension being comprised of an outer sleeve and an inner sleeve partially positioned within said outer sleeve in a telescoping arrangement; said wiring extension having a cross section substantially equal to the cross section of said enclosure; said inner or outer sleeve being secured to one end of said enclosure with the axes of said enclosure and said wiring extension being in line so as to form a continuous enclosure; said panel assembly and said first and second terminal assemblies being selectively supported and suspended on said rails for electrical connection from either end.

References Cited in the file of this patent

UNITED STATES PATENTS

| | | |
|---|---|---|
| 876,619 | Bliemeister | Jan. 14, 1908 |
| 2,343,178 | Frank et al. | Feb. 29, 1944 |
| 2,738,446 | Fleming | Mar. 13, 1956 |